United States Patent Office 2,803,221
Patented Aug. 20, 1957

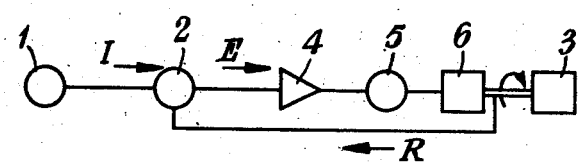
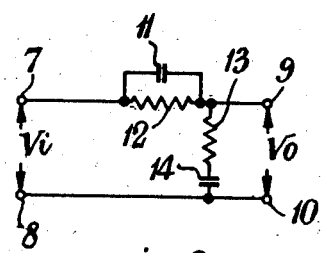
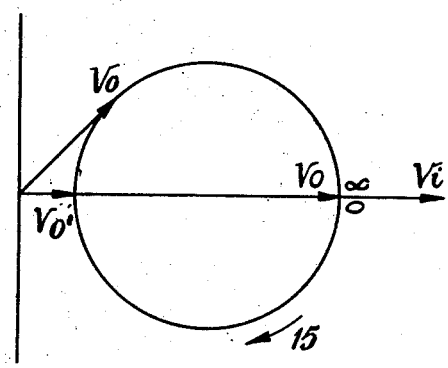
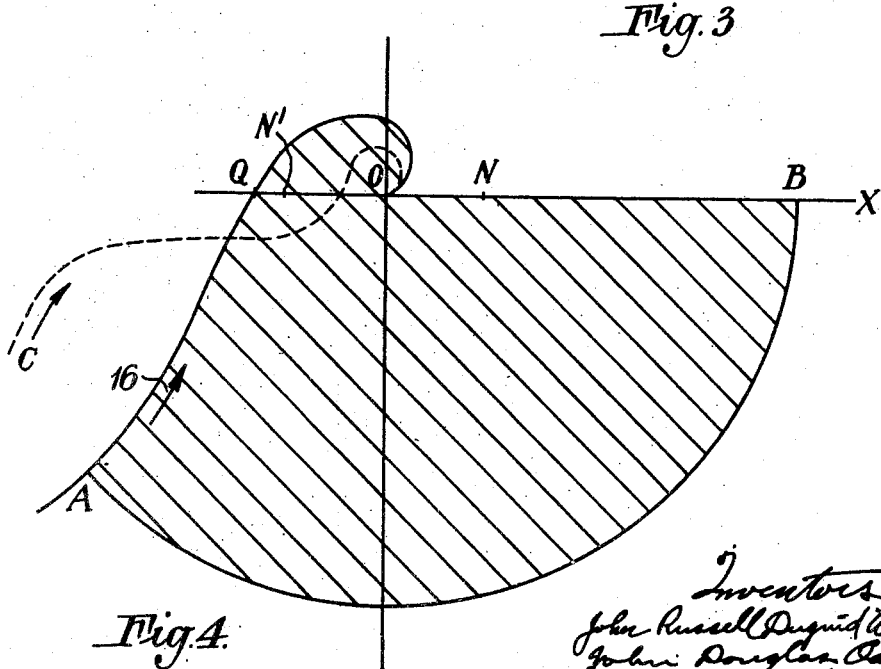

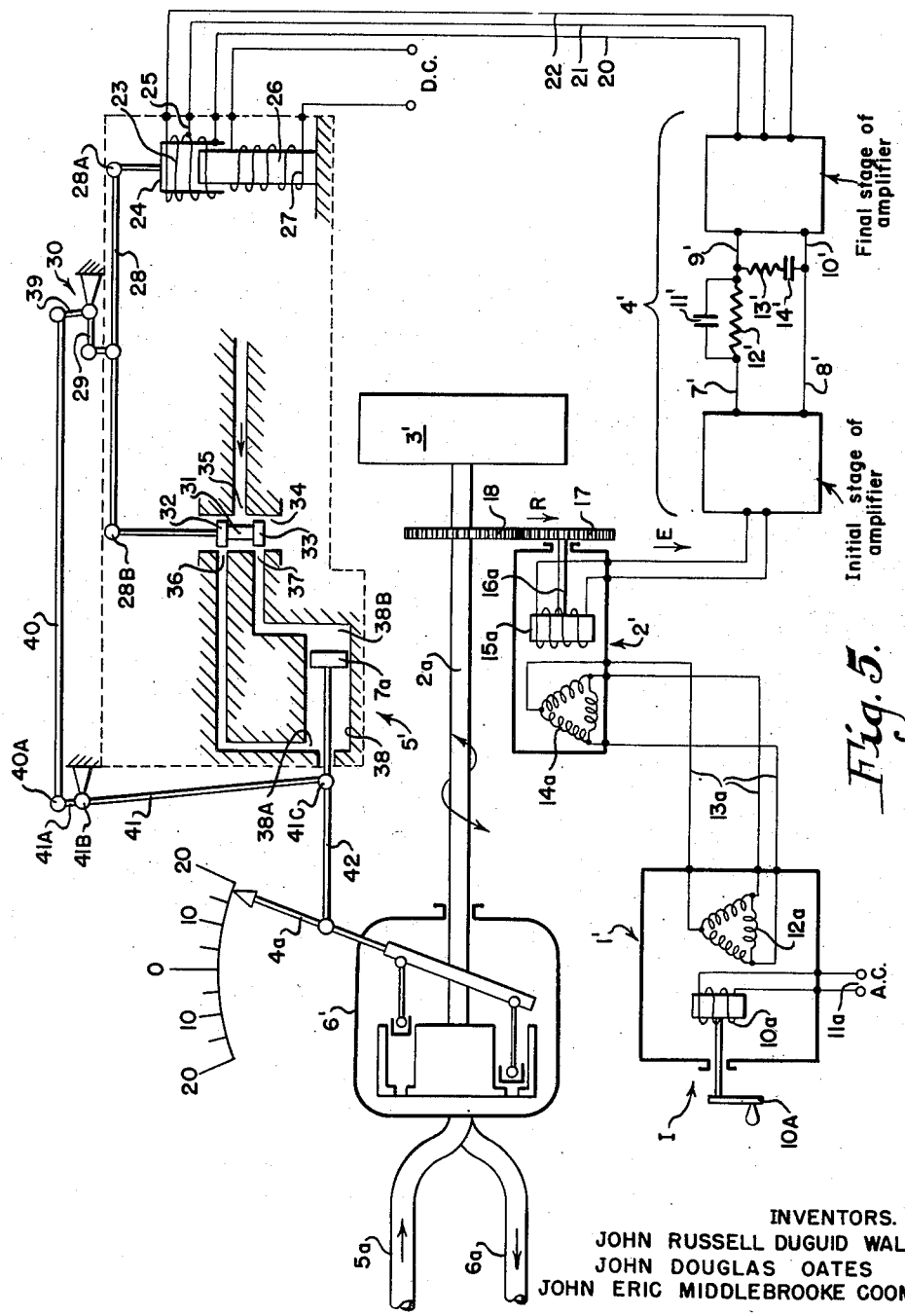

2,803,221

FOLLOW-UP REMOTE CONTROL SYSTEMS

John Russell Duguid Walker, Rugby, John Douglas Oates, London, and John Eric Middlebrooke Coombes, Manchester, England, assignors to Vickers-Armstrongs Limited, London, England, and to Metropolitan-Vickers Electrical Company Limited, London, England Application September 2, 1953, Serial No. 378,143

Claims priority, application Great Britain September 2, 1952

1 Claim. (Cl. 121—39)

This invention relates to follow-up remote control systems, and is more particularly concerned with such a system of the kind that comprises an electric director and an electric resetter for determining the "error" in posisitional correspondence of the director and resetter, the latter being in driving connection with a load shaft. The load shaft is also in driven connection with a hydraulic swash-plate motor. There are electrical connections as between the electric director and resetter and an amplifier, for applying an input signal to the amplifier, which signal is a function of said error. The amplified error signal is applied through servo means to the adjustment of the angulation of the hydraulic swash-plate motor, whereby such angulation is regulated by the positional difference between the director and resetter, so that the torque output of said hydraulic motor applied to the load is made dependent upon such positional displacement. A system of this kind is described in United States Patent No. 2,729,940, granted January 10, 1956, to John Russell Duguid Walker, one of the present applicants, for "Follow-Up Control Systems."

According to the present invention there is provided a system of the kind referred to, wherein the amplifier includes a lag-lead circuit for retarding the phase of and attenuating oscillations of the error signal below a particular frequency and for advancing the phase of and attenuating error signal oscillations above said particular frequency.

For a better understanding of the invention, reference will now be made to the accompanying drawing, in which:

Figure 1 is a diagrammatic representation of a follow-up remote control system, described in detail in the above-mentioned patent, Figure 2 is a circuit diagram of a lag-lead circuit, Figure 3 is a vector diagram for the circuit of Figure 2, and Figure 4 is a harmonic response diagram for the system of Figure 1, and Figure 5 is a diagrammatic view of a simplified follow-up control system described in the above mentioned patent and incorporating the units shown in Figure 1 and in which the lag-lead circuit of Figure 2 is incorporated in the amplifier.

The system of Figure 1 comprises a transmitter 1 constituting a director and which is electrically connected to a receiver or resetter 2, which latter is in driving connection with the load 3. The transmitter and resetter may be of the "selsyn" kind. Any misalignment between the input I of the transmitter 1 and the response R of the load 3 is applied by the resetter 2 as an error signal E to an electronic amplifier 4. The amplifier controls a servo unit 5 which, in turn, controls the angulation of a hydraulic swash-plate motor 6 which drives the load 3. The arrangement of the system is such that the torque output of the motor 6 applied to the load 3 is proportional to said misalignment.

The motor 6 is a hydraulic swash-plate motor of the well-known kind that has an adjustably tiltable swash plate, as described in the patent referred to above. The unit 5 is a hydraulic servo unit, which includes a piston and cylinder, the piston being connected through suitable linkage to effect tilting of the swash plate of the motor 6 when the piston is translated axially of the cylinder. The unit 5 also includes valves for controlling the flow of hydraulic liquid to each end of the cylinder of the unit 5, and the valves are operated by relays energized by the output of the amplifier 4. In a preferred form of construction, the servo unit 5 includes a hydraulic amplifier between the valves and the piston and cylinder assembly.

The amplifier 4 includes means for stabilising the control system. This stabilising means includes a lag-lead circuit. The lag-lead circuit is shown in Figure 2. The circuit has input terminals 7 and 8 and output terminals 9 and 10. A condenser 11 in parallel with a resistance 12 is connected between the terminals 7 and 9, and a resistance 13 in series with a condenser 14 is connected across the output terminals 9 and 10. The condenser 11 in association with the resistances 12 and 13 and with the condenser 14 short circuited, is a conventional lead circuit. The condenser 14 in association with the resistances 12 and 13 and with the condenser 11 open-circuited, is a conventional lag circuit. For the combined circuit shown in Figure 2 when an alternating voltage $V_i$ is applied across the terminals 7 and 8, the output voltage $V_o$ across the terminals 9 and 10 varies with frequency as indicated in the diagram shown in Figure 3, the arrow 15 indicating the direction for increasing frequencies. For oscillations at zero and infinite frequencies the circuit does not affect the phase of the voltage, and $V_o$ is therefore in phase with $V_i$. At a particular frequency the output voltage is attenuated to $V_o'$ without phase change. The circuit attenuates, and advances the phase of, oscillations at frequencies greater than the particular frequency, and retards and attenuates oscillations at frequencies less than the particular frequency.

Figure 4 is a harmonic vector response diagram obtained by plotting, for different frequencies, $$\frac{R}{E}$$

and $\phi$ relative to a fixed line OX, $\phi$ being the angle by which R leads E, E and R being expressed in degrees. The condition $E=-R$ corresponds to the point ($r=1$, $\phi=180$) marked N'. N' is known as the Nyquist point.

The curve AQO is a curve of a hypothetical harmonic response to an input $ON=E$ for the system of Figure 1 employing an amplifier which does not have the lag-lead circuit of Figure 2. The arrow 16 adjacent the curve AQO indicates the direction of increasing frequency of the error signal E applied to the amplifier. The point A on locus AQO represents a response at a very small frequency. With the origin O as centre and radius OA, an arc is struck in a counter-clockwise direction from A until it cuts the positive axis at B. Provided OA is greater than OQ, the Nyquist criterion for harmonic stability is that the follow-up remote control system is stable if the point N' is outside the closed figure shaded in Figure 4, i. e. outside the figure formed by the curve AQO, arc AB and the axis OB. If the point N' is enclosed in this figure the system will be liable to exhibit unstable motion of an increasing oscillation type. If the point N' is on the curve, the system will be liable to exhibit instability of a constant oscillation type.

It will be understood, therefore, that the curve AQO indicates that the control system will be unstable.

Referring to Figure 5 which is based on Fig. 1 of the above mentioned patent No. 2,729,940, in which the units of Figure 1 and the elements of Figure 2 are indicated by the same reference numerals to which a prime has been added, the hydraulic swash-plate motor 6' of the V. S. G. type (often called a "B" end), has its power output shaft 2a connected to the inertia load 3'. As is well known, the angulation of the swash-plate of a swash-plate motor will determine the torque output therefrom when the motor is supplied with constant pressure operating media. In this example the motor 6' is supplied via a pipe 5a with constant pressure oil which may be at a pressure of 1,100 lbs. per sq. inch. The motor 6' has an exhaust pipe 6a in which the pressure is near atmospheric. The extent of angulation of the swash-plate on either side of a zero setting is determined by a tilt lever 4a controlled by a servo ram 7a of the servo unit 5', the lever 4a being connected to the ram 7a by a rod 42.

The transmitter 1' consists of a so-called magslip or Selsyn device. The electrical receiver 2' consists of a resetter Selsyn device or magslip transmitter and resetter are in principle similar to Selsyn transmitter and receiver units. The magslip transmitter 1' consists of a single phase rotor winding 10a connected to a supply source 11a of alternating current. This current may be of low voltage, for example, 20, whilst however being of a frequency of the order of 1,100 cycles per sec. The rotor is turned manually by a directing means 10A. The stator 12a is wound in delta and is connected by three lines 13a to a similarly wound stator 14a in the resetter magslip 2'. The resetter magslip rotor 15a is substantially the same as that of the transmitter, but is mechanically connected by a shaft 16a and gear wheels 17 and 18 to the load shaft 2a. The winding of the rotor 15a is connected to the amplifier 4'.

The amplifier 4' incorporating the lag-lead circuit of Figure 2 between the initial and final stages of the amplifier, serves to rectify and amplify the signals which it receives. The lag-lead circuit of the amplifier is provided with input terminals 7' and 8' connected into the initial stage of the amplifier, and output terminals 9' and 10' connected into the final stage of the amplifier 4'. The condenser 11' in parallel with the resistance 12' is connected between the terminals 7' and 9', and the resistance 13' in series with a condenser 14' is connected across the output terminals 9' and 10'. The condenser 11' in association with the resistances 12' and 13', and with the condenser 14' short circuited, is a conventional lead circuit. The condenser 14' in association with the resistances 12' and 13', and with the condenser 11' open-circuited, is a conventional lag circuit. The manner in which the lag-lead circuit functions in the amplifier is described above in connection with Figures 2, 3 and 4.

The rectifier in the amplifier has the output derived from push-pull connections so that there are three output leads 20, 21, 22 from the final stage of the amplifier, the lead 21 preferably being grounded. The output leads 20 and 22 are connected one to each end of a coil 23 disposed upon an annular coil mount 24, the coil 23 having a centre tapping 25 connected to the lead 21. The coil mount 24 embraces the end of a core 26 upon which there is a constantly excited D. C. winding 27. Thus the core 26 and winding 27 together constitute an electromagnet on which the coil 23 and mount 24 move in accordance with the excitation current that the coil 23 receives from the amplifier 4'.

The coil mount 24 is carried pivotally at one end 28A of a link 28 which is itself pivotally supported between its ends by one arm 29 of a bell-crank lever 30. The end 28B of the link 28 is pivotally connected to a spool valve 31, in the servo unit 5'. The two end flanges 32, 33 of the spool valve 31 fit in a cylindrical bore 34 having three ports 35, 36, 37. The servo ram 7a is disposed in a cylinder 38, and the ports 36, 37 are connected to the cylinder 38 so that the port 36 is effectively in communication with the end 38A of the cylinder whilst the port 37 is in communication with the end 38B of the cylinder 38. The port 35 is connected to a source of pressure media which may be oil at, for example, 100 lbs. per sq. inch pressure. The spool valve 31 is generally arranged so that in one position it admits pressure fluid to neither of the ports 36, 37. This position represents a central position of the spool valve 31. If the spool valve is moved in one direction away from the central position, then it effectively connects the supply of pressure fluid to one of the ports 36, 37 connected with the ram cylinder 38, whereas movement of the spool valve 31 in the other direction effectively connects the other port of the ram cylinder 38 to the supply of pressure fluid. When connecting the supply of pressure fluid to one side of the ram cylinder 38, the spool valve also connects the other side of the ram cylinder to exhaust.

The bell-crank lever 29 has the other arm 39 thereof connected to a link 40. The latter is pivotally connected at its end 40A to one end 41A of a link 41 which is pivotally supported at a point 41B near to its pivotal connection with the link 40. The other end 41C of the link 41 is pivotally attached to the rod 42.

In order to explain the operation of the system described above, it will be supposed that the hydraulic swash-plate motor 6' is connected with a supply of constant pressure oil, and likewise that the spool valve 31 is similarly connected. It will also be supposed that the transmitter magslip rotor 10a is connected to an appropriate alternating current source. If the load 3' and the directing means (identifiable with the magslip rotor 10a) are in precise coincidence and the directing means is not being moved, then obviously the load will desirably be stationary. If now the directing means is moved, the rotor 10a of the transmitter magslip is correspondingly displaced and current is transmitted to the magslip resetter stator 14a with the result that an induced current appears in the magslip resetter rotor 15a. The current appearing in the resetter rotor 15a is a function of the degree of positional displacement existing as between the magslip transmitter 1' and resetter 2'. This current may therefore be regarded as an "error" signal E. This signal is rectified and amplified in the amplifier 4' and thereafter a corresponding direct current is applied to the moving coil 23. The moving coil is displaced a distance corresponding to the positional displacement as between the magslip transmitter 1' and resetter 2'. The displacement of the moving coil 23 causes a proportional displacement of the spool valve 31, so that depending upon the extent and direction of movement of the moving coil 23, so that spool valve 31 is set to supply pressure fluid to one side or the other of the servo ram 7a. The latter therefore moves and causes an appropriate displacement of the tilt lever 4a of the hydraulic swash-plate motor 6'. The latter develops torque proportional to the extent of tilting, and therefore the load 3' is moved in a direction such as to reduce and eventually cancel the positional displacement as between the resetter magslip 9a and the transmitter magslip 1'. By virtue of the links 41, 40, a displacement of the ram 7a under the action of hydraulic pressure media allowed to enter the ram cylinder 38 by the spool valve 31, will cause an immediate tendency for the spool valve 31 to be displaced in such manner as to tend to prevent further movement of the servo ram 7a.

By employing the lag-lead circuit in the amplifier, low frequency responses are retarded and attenuated, and high frequency responses are advanced and attenuated. The harmonic response curve of the system of Figure 1 when employing stabilising means having the lag-lead circuit, in the manner illustrated in Figure 5, is modified to the form shown by the dotted curve CO in Figure 4. The closed figure for the modified response curve does not have the point N' enclosed thereby and hence the modified system will not exhibit harmonic instability.

Use of the stabilising means described above permits the control system to be designed so that the attenuation of oscillations at a specified frequency can be made large compared with the attenuation of oscillations at ship roll and aiming frequencies, whereby a high degree of accuracy can be achieved without introducing instability. The control system is particularly useful when applied to the control of a naval gun.

It will be understood that if desired the director may be connected to receive a signal transmitted by the resetter, so that the director becomes a receiver and the resetter becomes a transmitter.

We claim:

In a follow-up remote control system including an electric director, an electric resetter for determining the "error" in positional correspondence of the director and resetter, a load shaft, a driving connection between the resetter and the load shaft, a hydraulic swash-plate motor of the kind having a tiltable swash plate, a driving connection between the motor and the load shaft, an electrical amplifier, electrical connections between the electric director, resetter and the amplifier for applying an input signal to the amplifier which signal is a function of said error, servo means, a connection between the servo means and the swash plate for adjusting the angle of tilt of the swash plate, and further electrical connections for applying the amplified error signal from the amplifier to the servo means, the improvement in which said electrical amplifier includes a lag-lead circuit for retarding the phase of and attenuating oscillations of the error signal below a particular frequency and for advancing the phase of and attenuating error signal oscillations above said particular frequency.

References Cited in the file of this patent

UNITED STATES PATENTS

| | | |
|---|---|---|
| 2,190,812 | Wahlmark | Feb. 20, 1940 |
| 2,384,962 | Pohl | Sept. 18, 1945 |
| 2,392,980 | Fawkes | Jan. 15, 1946 |
| 2,408,068 | Hull | Sept. 24, 1946 |
| 2,439,198 | Bedford | Apr. 6, 1948 |
| 2,470,099 | Hall | May 17, 1949 |
| 2,496,391 | Hall | Feb. 7, 1950 |
| 2,729,940 | Walker | Jan. 10, 1956 |